(12) United States Patent
Kawamoto et al.

(10) Patent No.: US 9,340,196 B2
(45) Date of Patent: May 17, 2016

(54) COASTING DOWNSHIFT CONTROL DEVICE FOR AUTOMATIC TRANSMISSION

(75) Inventors: Yoshinobu Kawamoto, Atsugi (JP); Hiroyuki Takenaka, Sagamihara (JP); Go Endo, Yokohama (JP)

(73) Assignees: NISSAN MOTOR CO., LTD., Yokohama-shi (JP); JATCO LTD, Fuji-shi (JP)

(*) Notice: Subject to any disclaimer, the term of this patent is extended or adjusted under 35 U.S.C. 154(b) by 22 days.

(21) Appl. No.: 14/343,142

(22) PCT Filed: Jun. 13, 2012

(86) PCT No.: PCT/JP2012/065082
§ 371 (c)(1),
(2), (4) Date: Mar. 6, 2014

(87) PCT Pub. No.: WO2013/035398
PCT Pub. Date: Mar. 14, 2013

(65) Prior Publication Data
US 2014/0200113 A1 Jul. 17, 2014

(30) Foreign Application Priority Data

Sep. 7, 2011 (JP) ................................ 2011-194559

(51) Int. Cl.
| F16H 61/06 | (2006.01) |
|---|---|
| B60W 10/10 | (2012.01) |
| B60W 10/02 | (2006.01) |
| F16H 61/14 | (2006.01) |
| F16H 59/18 | (2006.01) |
| F16H 61/04 | (2006.01) |

(52) U.S. Cl.
CPC ............. *B60W 10/10* (2013.01); *B60W 10/023* (2013.01); *F16H 61/061* (2013.01); *F16H 61/14* (2013.01); *F16H 2059/186* (2013.01); *F16H 2061/0496* (2013.01); *Y10T 477/633* (2015.01)

(58) Field of Classification Search
None
See application file for complete search history.

(56) References Cited

U.S. PATENT DOCUMENTS

2010/0057311 A1* 3/2010 Okazaki et al. ................. 701/54

FOREIGN PATENT DOCUMENTS

JP 2010-078124 A 4/2010

\* cited by examiner

*Primary Examiner* — Ramya Burgess
*Assistant Examiner* — Mark Manley
(74) *Attorney, Agent, or Firm* — Foley & Lardner LLP

(57) ABSTRACT

Under a specified condition where a torque converter is kept in a lockup state to prolong the fuel-cutoff time, because of vehicle coasting with an accelerator opening APO=0, a downshift command is generated and then an automatic transmission causes a reengagement downshift by a drop in a release-side clutch hydraulic pressure Poff and a rise in an engagement-side clutch hydraulic pressure Pon. During the reengagement downshift, the engagement-side clutch hydraulic pressure Pon is reduced from a high lockup-ON hydraulic pressure to a low lockup-OFF hydraulic pressure after the time when the lockup is predicted to be released, thus preventing a torque drawing-in tendency of transmission output torque, which may occur at the time of the beginning of the inertia phase, from increasing, and also reducing in the width of a subsequent change in vehicle deceleration G, and consequently enhancing the shift quality.

14 Claims, 5 Drawing Sheets

PRIOR ART

COASTING DOWNSHIFT CONTROL DEVICE FOR AUTOMATIC TRANSMISSION

TECHNICAL FIELD

The present invention relates to a shift control device for an automatic transmission configured to transmit power from an engine through a torque converter.

Specifically, the present invention relates to a shift control device in which an automatic transmission causes a downshift by switching (reengagement) between speed-change friction elements in a coast lockup state where an input element and an output element are directly coupled together within a torque converter because of during coast-torque transmission in an engine no-load condition.

BACKGROUND ART

One such reengagement downshift control, executed in a coast lockup state, has been disclosed and proposed in Patent document 1.

The aforementioned conventional reengagement downshift control technique aims at keeping a lockup state (a coast lockup state), in which an input element and an output element are directly coupled together within a torque converter, as long as possible, so that engine speed can be held at speeds higher than the fuel-cutoff recovery rotational speed (the fuel-injection restart rotational speed), in order to improve fuel economy by prolonging the engine fuel-cutoff time (i.e., the fuel-injection stop time) under an engine no-load condition. Hence, the engagement hydraulic pressure of a reengagement-downshift speed-change friction element is determined on the assumption that the torque converter is in the previously-discussed coast lockup state.

However, suppose that, of these reengagement-downshift speed-change friction elements, the engagement hydraulic pressure of an engagement-side speed-change friction element to be switched from its release state to its engagement state is determined on the assumption that the torque converter is in the coast lockup state. In such a case, there is the following concern.

That is, it may become an operating condition in which the lockup state of the torque converter should be released, even though the same engine no-load condition remains unchanged after a downshift followed by switching (reengagement) between friction elements in a coast lockup state has been started.

In such a case, according to the conventional coasting reengagement downshift control, the downshift will progress based on the engagement hydraulic pressure of an engagement-side speed-change friction element, which pressure is determined on the assumption that the torque converter is in a coast lockup state.

However, with the torque converter whose lockup state has been practically released, a transmitted torque (coast torque) of the automatic transmission becomes less than a transmitted torque (coast torque) in the coast lockup state. Thus, the engagement hydraulic pressure of the engagement-side speed-change friction element tends to become excessively high as compared to the transmitted torque of the automatic transmission.

For the reasons discussed above, there is an increased tendency for the drawing-in phenomenon of torque to occur at the beginning of the inertia phase during reengagement-downshifting. Also, there is an increased tendency for the pop-up phenomenon of torque to occur at the end of the inertia phase during reengagement-downshifting. Anyway, there is a problem that the shift quality of the coasting reengagement downshift is deteriorated.

CITATION LIST

Patent Literature

Patent document 1: Japanese Patent Provisional Publication No. 2010-078124 (A)

SUMMARY OF INVENTION

The present invention is based on a practical viewpoint that the lockup state of a torque converter may be released, even though the same engine no-load condition remains unchanged after a reengagement downshift in a coast lockup state has been started.

In view of the above, an object of the invention is to provide a coasting downshift control device for an automatic transmission configured to avoid the aforementioned problem of a deterioration in the shift quality by reducing an engagement hydraulic pressure of an engagement-side speed-change friction element based on a prediction that a release of the lockup occurs.

A coasting downshift control device for an automatic transmission of the invention is constructed as follows:

First, as a prerequisite, an automatic transmission is directed to an automatic transmission in which power from an engine is transmitted through a torque converter.

The torque converter becomes shifted to a coast lockup state where an input element and an output element are directly coupled together under a predetermined condition during coast-torque transmission with the engine kept in a no-load condition.

When the automatic transmission causes a reengagement downshift to a low-speed-gear shift stage by a transition of a certain speed-change friction element (a first speed-change friction element) to the engagement side and a transition of another speed-change friction element (a second speed-change friction element) to the release side in the coast lockup state, the engagement hydraulic pressure of the first speed-change friction element is set to a lockup-ON hydraulic pressure higher than a lockup-OFF hydraulic pressure suited for the reengagement downshift in a lockup-OFF state where a direct-coupling between the input element and the output element is released.

According to the invention, in the aforementioned automatic transmission, also provided are a lockup release prediction means and an engagement-side speed-change hydraulic pressure reduction means.

The previously-noted lockup release prediction means is configured to predict that a release of the lockup state occurs during the reengagement downshift in the coast lockup state.

The engagement-side speed-change hydraulic pressure reduction means is configured to reduce the engagement hydraulic pressure of the first speed-change friction element to below the lockup-ON hydraulic pressure from a point of time when the lockup release prediction means predicts that the release of the lockup state occurs during the reengagement downshift.

In the coasting downshift control device for the automatic transmission of the invention, when the lockup is predicted to be released during a reengagement downshift in the coast lockup state, the engagement hydraulic pressure of the first speed-change friction element corresponding to the engagement-side speed-change friction element is reduced to below the lockup-ON hydraulic pressure from the point of time of the prediction of the lockup release. There is a less risk that the lockup state is released but the engagement hydraulic pressure of the first speed-change friction element is maintained at the high lockup-ON hydraulic pressure. Actually, the engagement hydraulic pressure of the first speed-change friction element becomes reduced to a hydraulic pressure lower than the lockup-ON hydraulic pressure.

Therefore, when a transmitted torque of an automatic transmission drops due to a release of the lockup state, in response to this, the engagement hydraulic pressure of the first speed-change friction element corresponding to the engagement-side speed-change friction element is reduced. Thus, it is possible to avoid the engagement hydraulic pressure of the first speed-change friction element from becoming excessively high as compared to the transmitted torque of the automatic transmission.

Hence, it is possible to avoid both the increased torque drawing-in tendency occurring at the beginning of the inertia phase during reengagement-downshifting and the increased torque pop-up tendency occurring at the end of the inertia phase during reengagement-downshifting, thereby preventing a deterioration of the shift quality of the coasting reengagement downshift.

DESCRIPTION OF EMBODIMENTS

Figure 1:
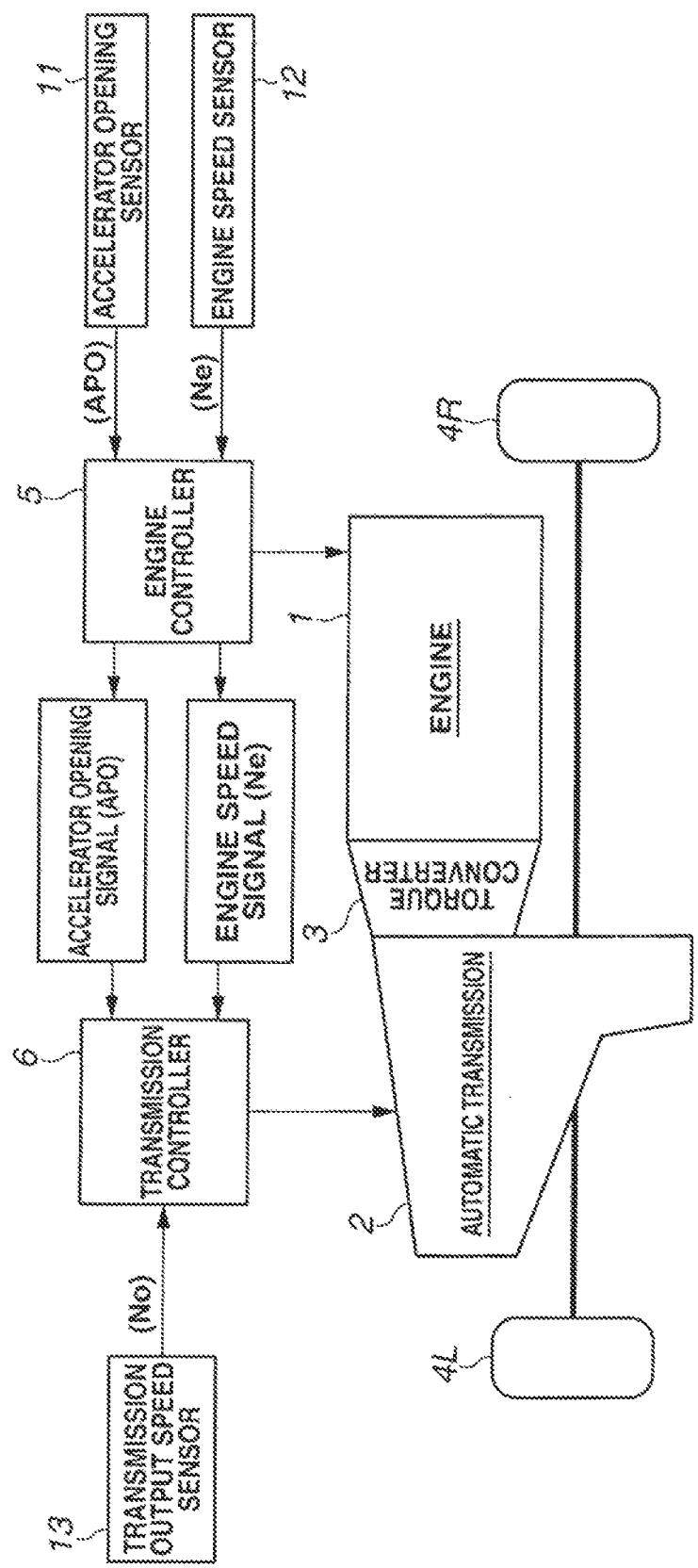
FIG. 1 is a system diagram illustrating an automotive power train, employing a coasting downshift control device for an automatic transmission of one embodiment made according to the invention, together with its control system.

Embodiments that realize a coasting downshift control device for an automatic transmission, made according to the invention, are hereinafter described in detail in reference to the embodiment shown in the drawings.

<Construction>

Referring to FIG. 1, there is shown a system diagram illustrating an automotive power train, employing a coasting downshift control device for an automatic transmission of one embodiment made according to the invention, together with its control system.

The power train of FIG. 1 employs an engine 1 and an automatic transmission 2. Engine 1 and automatic transmission 2 are drivingly connected to each other via a torque converter 3.

In the shown embodiment, automatic transmission 2 is constructed by a stepped automatic transmission capable of selecting a desired shift stage by selectively engaging a variety of speed-change friction elements (clutches and brakes). Concretely, automatic transmission 2 is constructed by an automatic transaxle for a front-wheel-drive vehicle having a built-in differential gear unit (not shown).

Left and right drive road wheels (front road wheels) 4L, 4R are connected to the output shaft of automatic transmission 2 through the differential gear unit.

Torque converter 3 is constructed, such that internal working fluid is directed radially outward by a centrifugal force, caused by a pump impeller (an input element), and thrown into a turbine runner (an output element), and thereby hydraulically drive the turbine runner with a torque-multiplication effect by a reaction of a stator (a reaction element), while being redirected back to the pump impeller via the stator.

By the way, torque converter 3 is configured to provide a lockup state where the pump impeller (the input element) and the turbine runner (the output element) are directly coupled together by means of a lockup clutch, as needed.

In this manner, power from the engine 1 is inputted through the torque converter 3 into the automatic transmission 2, automatic transmission 2 speed-changes (torque-changes) the engine power depending on a selected shift stage, and then the changed power is transmitted from the differential gear unit through the left and right drive road wheels (front road wheels) 4L, 4R, thereby enabling vehicle traveling.

Although it is not clearly shown, engine 1 employs an electronically-controlled throttle valve, which is installed in an intake pipe and whose opening is basically controlled to a throttle opening determined based on an accelerator opening (an amount of depression of an accelerator pedal) APO. Also, the throttle opening is appropriately increased or decreased responsively to an engine output (torque) control requirement, separately from the accelerator opening APO, for the purpose of causing torque-down or torque-up of the engine 1.

Engine 1 operates by spark-igniting an air/fuel mixture of a controlled amount of intake-air controlled by the throttle valve and an amount of fuel injected and supplied by an injector.

Electronic control for the throttle valve, an injection amount of fuel injected from the injector, and ignition timing for spark plugs, together with other engine control actions (valve-lift control for intake and exhaust valves, and valve open timing and valve closure timing control for compression-ratio control) are performed by an engine controller 5.

For this purpose, engine controller 5 receives a signal from an accelerator opening sensor 11 for detecting the accelerator opening APO and a signal from an engine speed sensor 12 for detecting an engine revolution speed Ne.

Shift control of automatic transmission 2 and lockup control for torque converter 3 are performed by a transmission controller 6.

For this purpose, transmission controller 6 receives the input informational data signals about the accelerator opening APO and the engine speed Ne via the engine controller 5, and also receives a signal from a transmission output speed sensor 13 for detecting a transmission output speed No (vehicle speed VSP).

Transmission controller 6 determines, based on the input information, a desired shift stage of automatic transmission 2 from a preprogrammed shift map, and also performs switching between engagement (application) and disengagement (release) with respect to corresponding speed-change friction elements, so as to shift the automatic transmission 2 from the presently selected shift stage to the desired shift stage.

<Coasting Reengagement Downshift Control>

Transmission controller 2 further executes the control program shown in FIG. 2, so as to accomplish coasting reengagement downshift control (as detailed later) at which the invention aims.

Figure 2:
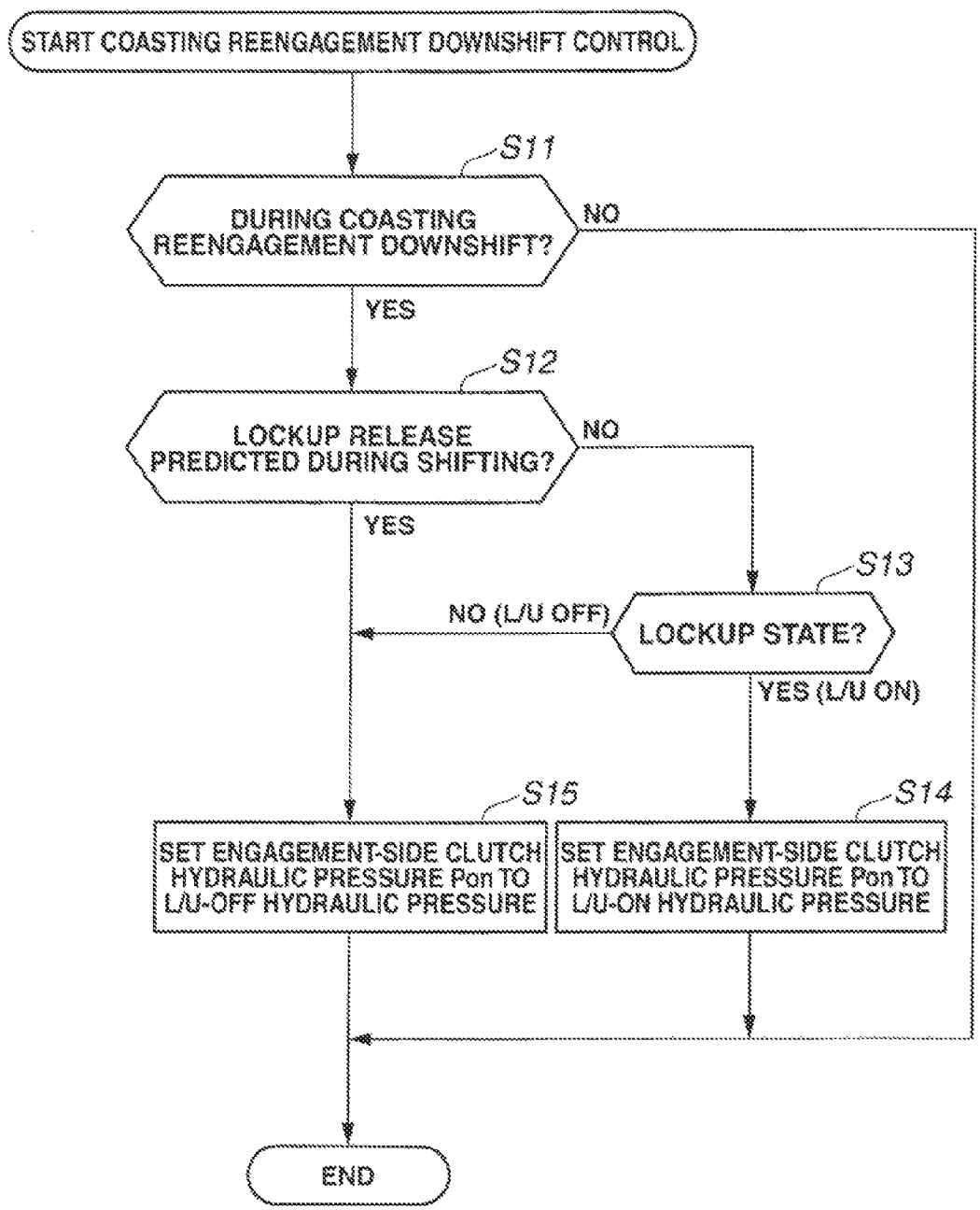
FIG. 2 is a flowchart illustrating a main routine of coasting reengagement downshift control executed within a transmission controller of FIG. 1.
Figure 3:
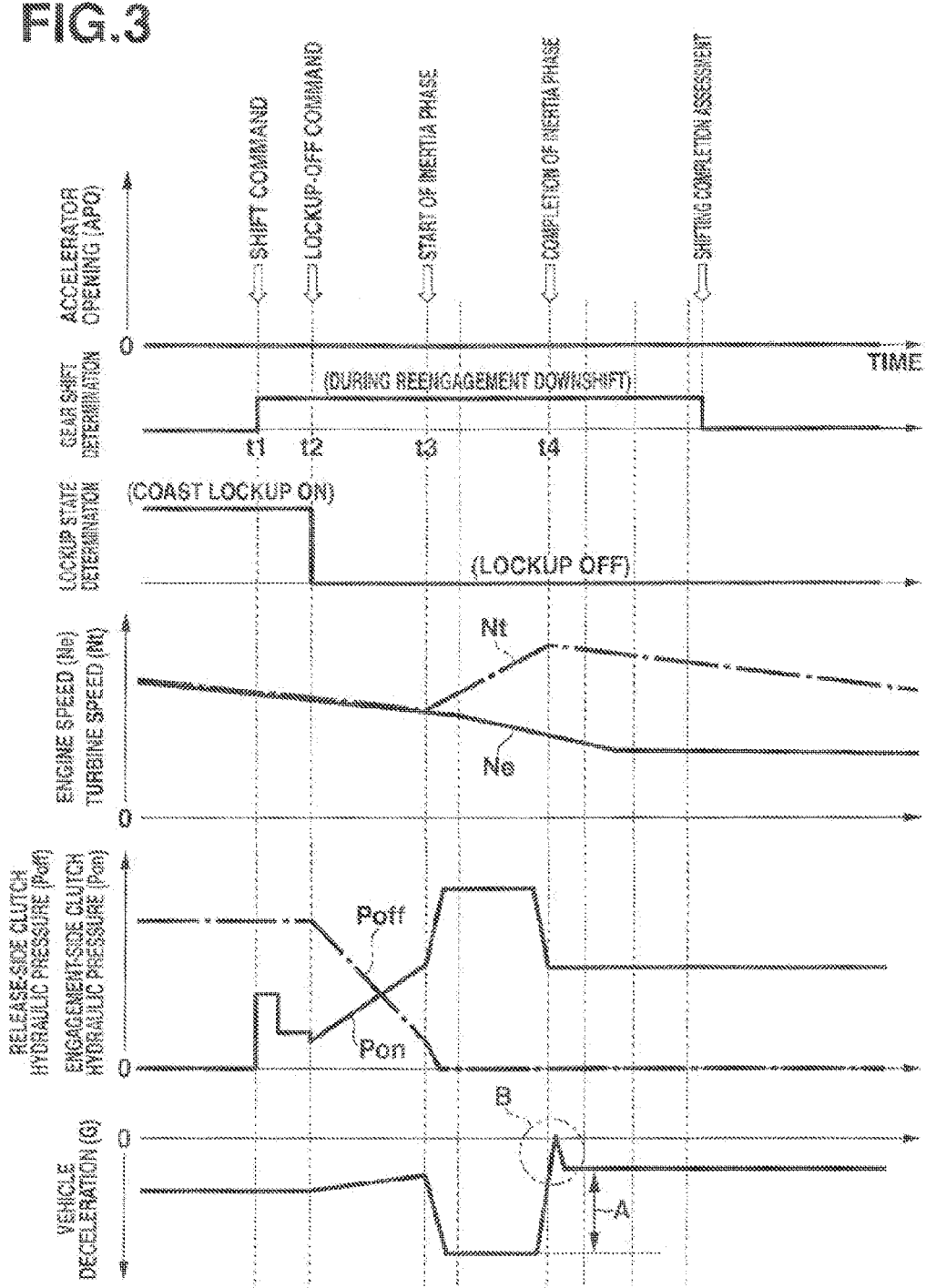
FIG. 3 is a shifting-operation time chart illustrating a conventional coasting downshift control action.

Before explaining the coasting reengagement downshift control program of FIG. 2, the reason that needs this control is explained in reference to FIG. 3.

Referring to FIG. 3, there is shown a shifting-operation time chart illustrating the conventional coasting downshift control. Owing to vehicle coasting in an engine no-load condition in which the accelerator pedal is released (i.e., accelerator opening APO=0), in order to prolong the fuel-cutoff time by suppressing a drop in engine speed Ne, torque converter 3 is kept in a coast lockup state where the input element and the output element are directly coupled or locked together. Under these conditions, at the point of time t1, a shift command (a downshift command) is generated. In response to this, a reengagement downshift of automatic transmission 2 is performed by switching the release-side clutch (the release-side speed-change friction element) from the engagement state to the release state by a drop in release hydraulic pressure Poff (as shown in the drawing) and by switching the engagement-side clutch (the engagement-side speed-change friction element) from the release state to the engagement state by a rise in engagement hydraulic pressure Pon (as shown in the drawing).

During the reengagement downshift in the coast lockup state, the engagement-side clutch hydraulic pressure Pon is controlled to a high pressure value (a lockup-ON hydraulic pressure) shown in the drawing and suited for a large transmitted torque (coast torque) of automatic transmission 2, because of the torque converter kept in the coast lockup state, thereby prolonging the fuel-cutoff time by suppressing a drop in engine speed Ne.

As discussed previously, according to the conventional coasting downshift control, during the reengagement downshift, the engagement-side clutch hydraulic pressure Pon is continuously determined as the previously-noted high lockup-ON hydraulic pressure unconditionally on the assumption that the coast lockup state is kept constant. Therefore, the following problem may be produced.

That is, it may become an operating condition in which the lockup state of torque converter 3 should be released (turned off), even though the same engine no-load condition remains unchanged after the point of time t1 when the reengagement downshift in the coast lockup state has been started.

For instance, assume that a transition to the previously-noted operating condition occurs at the point of time t2 during the reengagement downshift and thus a lockup-OFF command of torque converter 3 is generated. In response to this, the coast lockup of torque converter 3 may be released.

Problems, occurring when the engagement-side clutch hydraulic pressure Pon has been determined as a high lockup-ON hydraulic pressure in a conventional manner after the lockup has been released, are hereunder explained.

That is, as shown in FIG. 3, when the engagement-side clutch hydraulic pressure Pon has been determined as a high lockup-ON hydraulic pressure in a conventional manner after the coast lockup of torque converter 3 has been released, the following problem takes place.

Owing to a release of the lockup, a transmitted torque (coast torque) of the automatic transmission becomes less than a transmitted torque (coast torque) in the coast lockup state. Thus, the engagement-side clutch hydraulic pressure Pon tends to become excessively high as compared to the transmitted torque of the automatic transmission.

For the reasons discussed above, first, a torque drawing-in tendency of transmission output torque, occurring at the point of time t3 of the beginning (start) of the inertia phase during reengagement-downshifting, increases, and thus a width "A" of a subsequent change in vehicle deceleration G becomes great as shown in the time chart.

Furthermore, the direct-coupling between engine 1, serving as a resistance to a rise in turbine speed Nt (transmission input rotational speed), and automatic transmission 2 is disengaged due to the lockup release during the inertia phase from the point of time t3 of the beginning of the inertia phase to the point of time t4 of the end (completion) of the inertia phase. Thus, as shown in the time chart, a rapid rise in turbine speed Nt (transmission input rotational speed) occurs. Such a turbine-speed increment causes a remarkable pop-up phenomenon of transmission output torque at the point of time t4 of the end of the inertia phase (corresponding to the substantial shifting end). This results in a momentary large increase "B" in vehicle deceleration G.

The great width "A" of a change in vehicle deceleration G and the momentary large increase "B" in vehicle deceleration G become factors that increase shift shock during the coasting reengagement downshift. Anyway, these factors cause a remarkable deterioration in the shift quality of the coasting reengagement downshift.

The present embodiment is based on the viewpoint that the lockup state of torque converter 3 may be released, even though the same engine no-load condition remains unchanged after the point of time t1 when the reengagement downshift in the coast lockup state has been started. In view of the above, when the lockup is predicted to be released like the point of time t1 of FIG. 3, transmission controller 6 executes the control program of FIG. 2 based on the prediction of the lockup release, and whereby the problem of a deterioration in the shift quality can be solved by reducing the engagement-side clutch hydraulic pressure Pon. In this manner, the control device of the embodiment is configured to realize a solution to the aforementioned problem.

Concretely, at step S11 of FIG. 2, a check is made to determine whether automatic transmission 2 is in a coasting reengagement downshift, achieved by release-to-engagement switching of the engagement-side clutch by a rise in engagement-side clutch hydraulic pressure Pon and by engagement-to-release switching of the release-side clutch by a drop in release-side clutch hydraulic pressure Poff, while keeping the torque converter 3 in the coast lockup state.

While step S11 determines that the automatic transmission is out of the coasting reengagement downshift, it is unnecessary to execute hydraulic-pressure-drop control for engagement-side clutch hydraulic pressure Pon shown in FIG. 2 for the aforementioned problem solving, and thus the control routine terminates. Hence, the engagement-side clutch hydraulic pressure Pon is controlled in accordance with normal control.

Conversely when step S11 determines that the automatic transmission is in the coasting reengagement downshift, it is necessary to execute hydraulic-pressure-drop control for engagement-side clutch hydraulic pressure Pon shown in FIG. 2 for the aforementioned problem solving, and thus the control routine proceeds to step S12 and subsequent steps.

Step S12 makes a prediction to determine whether an operating condition, in which a lockup state of torque converter 3 should be released, occurs during the reengagement downshift, that is, whether a release of the lockup state occurs during the reengagement downshift.

Step S12 corresponds to the lockup release prediction means of the invention. For instance, the lockup release during reengagement-downshifting can be predicted according to the following check items (1)-(2).

(1) The lockup is predicted to be released (turned off) during a reengagement downshift in a coast lockup state, when the vehicle speed difference between a coast lockup downshift command vehicle speed (a downshift command vehicle speed determined based on the corresponding downshift line on the previously-discussed shift map) when a reengagement downshift command in the coast lockup state is generated and a lockup-release vehicle speed, at which the lockup state of torque converter 3 should be released, becomes greater than or equal to a predetermined threshold value.

Hereupon, the previously-noted predetermined threshold value to be compared to the vehicle speed difference is set to a smaller value, as a degree of easier lockup-releasing increases depending on the magnitude of vehicle deceleration G and/or depending on whether a brake pedal is depressed (that is, whether the brakes are applied).

(2) The lockup is predicted to be released (turned off) during a reengagement downshift in a coast lockup state, when the vehicle speed difference between an actual vehicle speed during the reengagement downshift in the coast lockup state and a lockup-release vehicle speed, at which the lockup state of torque converter 3 should be released, becomes greater than or equal to a predetermined threshold value.

Hereupon, the previously-noted predetermined threshold value to be compared to the vehicle speed difference is set to a smaller value, as a degree of easier lockup-releasing increases depending on the magnitude of vehicle deceleration G, depending on whether a brake pedal is depressed (that is, whether the brakes are applied) and/or depending on a progress of reengagement-downshifting.

When step S12 predicts that the lockup release does not occur during the reengagement downshift, the routine proceeds to step S13 at which a check is made to determine whether torque converter 3 is in a lockup state (lockup-ON state) or in a lockup-release state (lockup-OFF state).

When step S13 determines that torque converter 3 is in the lockup state, a deterioration in the shift quality does not occur even if the engagement-side clutch hydraulic pressure Pon is the high lockup-ON hydraulic pressure. Additionally, owing to a large transmitted torque (coast torque) of automatic transmission 2, the engagement-side clutch hydraulic pressure Pon has to be risen. Hence, at step S14, the engagement-side clutch hydraulic pressure Pon is set to the lockup-ON hydraulic pressure.

Conversely when step S13 determines that torque converter 3 is out of the lockup state, a deterioration in the shift quality arises from the engagement-side clutch hydraulic pressure Pon set to the high lockup-ON hydraulic pressure. To avoid this, at step S15, the engagement-side clutch hydraulic pressure Pon is set to a lockup-OFF hydraulic pressure lower than the lockup-ON hydraulic pressure and suited for the transmitted torque (coast torque) of automatic transmission 2 in the lockup-release state.

In contrast, when step S12 predicts that the lockup release occurs during the reengagement downshift, a deterioration in the shift quality arises from the engagement-side clutch hydraulic pressure Pon set to the high lockup-ON hydraulic pressure when the lockup release has been practically performed. To avoid this, at step S15, the engagement-side clutch hydraulic pressure Pon is set to a lockup-OFF hydraulic pressure lower than the lockup-ON hydraulic pressure.

Therefore, step S15 corresponds to the engagement-side speed-change hydraulic pressure reduction means.

<Effects>

Figure 4:
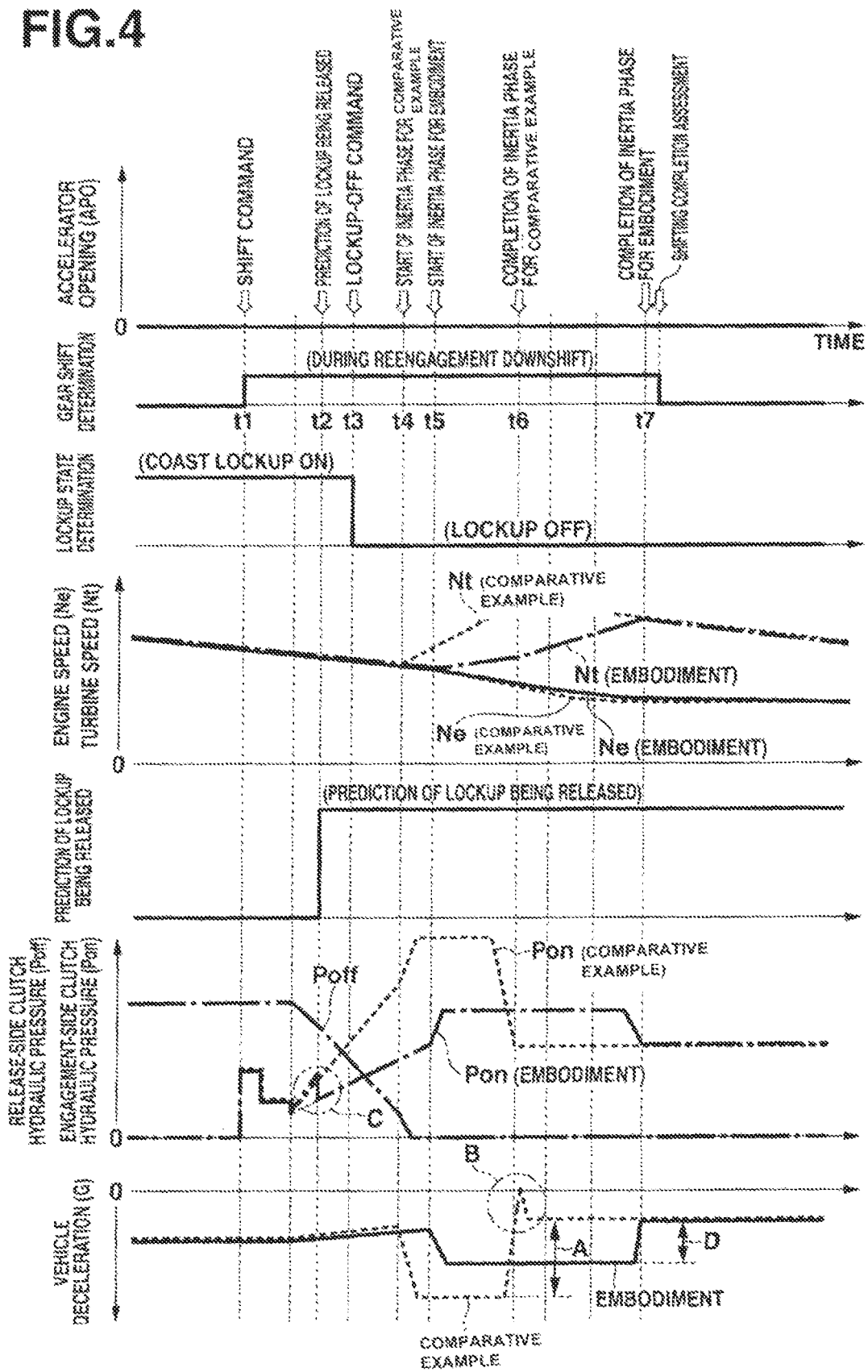
FIG. 4 is a shifting-operation time chart illustrating a control action of coasting reengagement downshift control of FIG. 2, carried out when a prediction of the lockup release has been made at a comparatively later time (at the comparatively later timing) during a reengagement downshift.
Figure 5:
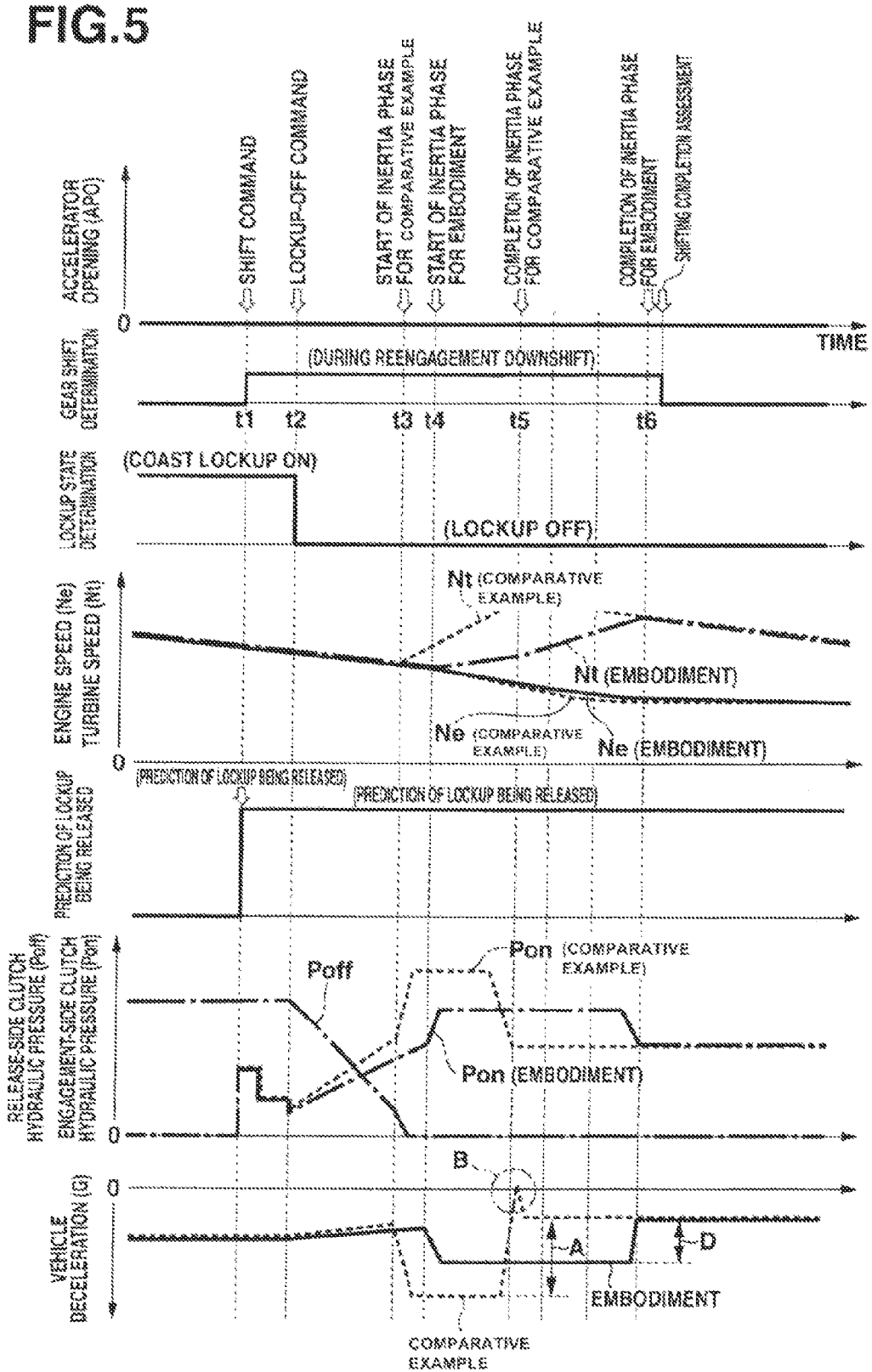
FIG. 5 is a shifting-operation time chart illustrating a control action of coasting reengagement downshift control of FIG. 2, carried out when a prediction of the lockup release has been made at a comparatively earlier time (at the comparatively earlier timing) during a reengagement downshift.

Effects obtained by the previously-discussed embodiment are hereunder explained in reference to shifting-operation time charts of FIGS. 4-5.

FIG. 4 shows a shifting-operation time chart in the case that a prediction (see step S12) of the lockup release has been made at a comparatively later time (at the comparatively later timing) during a coasting reengagement downshift.

FIG. 5 shows a shifting-operation time chart in the case that a prediction (see step S12) of the lockup release has been made at a comparatively earlier time (at the comparatively earlier timing) during a coasting reengagement downshift.

<Effects in the Case of FIG. 4>

In FIG. 4, under the same operating condition as FIG. 3, the operating waveforms of the embodiment are indicated by a one-dotted line and a solid line, whereas, only for the purpose of comparison, the operating waveforms of FIG. 3 are transferred and indicated by a broken line.

In FIG. 4, owing to vehicle coasting in an engine no-load condition in which the accelerator pedal is released (i.e., accelerator opening APO=0), in order to prolong the fuel-cutoff time by suppressing a drop in engine speed Ne, torque converter 3 is kept in a coast lockup state. Under these conditions, at the point of time t1, a shift command (a downshift command) is generated. In response to this, a reengagement downshift of automatic transmission 2 is performed by switching the release-side clutch (the release-side speed-change friction element) from the engagement state to the release state by a drop in release hydraulic pressure Poff (as shown in the drawing) and by switching the engagement-side clutch (the engagement-side speed-change friction element) from the release state to the engagement state by a rise in engagement hydraulic pressure Pon (as indicated by the one-dotted line).

During the reengagement downshift in the coast lockup state, the engagement-side clutch hydraulic pressure Pon is controlled to a high pressure value (a lockup-ON hydraulic pressure) suited for a large transmitted torque (coast torque) of automatic transmission 2, because of the torque converter kept in the coast lockup state, thereby prolonging the fuel-cutoff time by suppressing a drop in engine speed Ne.

As previously discussed, according to the embodiment, during the reengagement downshift, the engagement-side clutch hydraulic pressure Pon is reduced from the high lockup-ON hydraulic pressure to the low lockup-OFF hydraulic pressure (see step S15) as seen in the section "C" marked with a circle indicated by the one-dotted line after the point of time t2 when the lockup is predicted to be released (see step S12) without unconditional setting (see the broken line) of the engagement-side clutch hydraulic pressure Pon to the high lockup-ON hydraulic pressure.

Hence, the embodiment provides the following effects.

Suppose that the engagement-side clutch hydraulic pressure Pon is continuously determined as the high lockup-ON hydraulic pressure (see the broken line) after the point of time t2 when the lockup is predicted to be released, and thereafter the coast lockup of torque converter 3 is released in response to a lockup-OFF command at the point of time t3 during the reengagement downshift. In such a case, the engagement-side clutch hydraulic pressure Pon tends to become excessively high as compared to the transmitted torque of the automatic transmission.

For the reasons discussed above, owing to an increased torque drawing-in tendency of transmission output torque, occurring at the point of time t4 of the beginning of the inertia phase during reengagement-downshifting, thereafter, a width "A" of a change in vehicle deceleration G tends to become great as indicated by the broken line.

Furthermore, the direct-coupling between engine 1, serving as a resistance to a rise in turbine speed Nt (transmission input rotational speed), and automatic transmission 2 is disengaged due to the lockup release during the inertia phase from the point of time t4 of the beginning of the inertia phase to the point of time t6 of the end of the inertia phase. Thus, as indicated by the broken line in the time chart, a rapid rise in turbine speed Nt (transmission input rotational speed) occurs. Owing to such a turbine-speed rise, a remarkable pop-up phenomenon of transmission output torque occurs at the point of time t6 of the end of the inertia phase (corresponding to the substantial shifting end). This results in a momentary large increase "B" in vehicle deceleration G.

The great width "A" of a change in vehicle deceleration G and the momentary large increase "B" in vehicle deceleration G become factors that increase shift shock during the coasting reengagement downshift. Anyway, these factors cause a remarkable deterioration in the shift quality of the coasting reengagement downshift.

In contrast, according to the embodiment, after the point of time t1 when the reengagement downshift in the coast lockup state has been started, the engagement-side clutch hydraulic pressure Pon is reduced from the high lockup-ON hydraulic pressure (indicated by the broken line) to the low lockup-OFF hydraulic pressure (see step S15) as seen in the section "C" marked with a circle indicated by the one-dotted line after the point of time t2 when the lockup is predicted to be released (see step S12).

Hence, the engagement-side clutch hydraulic pressure Pon does not become excessively high as compared to the transmitted torque (coast torque) of the automatic transmission when the lockup has been released, but becomes an appropriate pressure value.

Therefore, it is possible to prevent a torque drawing-in tendency of transmission output torque, which may occur at the point of time t5 of the beginning of the inertia phase during reengagement-downshifting, from increasing. Hence, it is possible to reduce a width "D" of a subsequent change in vehicle deceleration G as indicated by the solid line.

A rise in turbine speed Nt, arising from disengagement of the direct-coupling between engine 1, serving as a resistance to a rise in turbine speed Nt (transmission input rotational speed), and automatic transmission 2 due to the lockup release during the inertia phase from the point of time t5 of the beginning of the inertia phase to the point of time t7 of the end of the inertia phase, can be changed gently by virtue of a drop in engagement-side clutch hydraulic pressure Pon (see step S15) as indicated by the one-dotted line.

Such a rise in turbine speed Nt (transmission input rotational speed) tends to cause a pop-up phenomenon of transmission output torque at the point of time t7 of the end of the inertia phase (corresponding to the substantial shifting end). However, there is a less occurrence of the pop-up phenomenon of transmission output torque at the point of time t7 of the end of the inertia phase (corresponding to the substantial shifting end) because of the gentle rise in turbine speed Nt (transmission input rotational speed). Thus, vehicle deceleration G can be changed smoothly at the point of time t7 of the end of the inertia phase as indicated by the solid line, without any momentary large vehicle-deceleration increase "B".

By virtue of the small width "D" of the change in vehicle deceleration G and the smooth change in vehicle deceleration G in time series, it is possible to suppress an increase in shift shock during the coasting reengagement downshift, thus enhancing the shift quality of the coasting reengagement downshift.

<Effects in the Case of FIG. 5>

In a similar manner to FIG. 4, in FIG. 5, under the same operating condition as FIG. 3, the operating waveforms of the embodiment are indicated by a one-dotted line and a solid line, whereas, only for the purpose of comparison, the operating waveforms of FIG. 3 are transferred and indicated by a broken line. However, FIG. 5 shows the shifting-operation time chart when a prediction (see step S12) of the lockup release has been made at the point of time t1, corresponding to a shift command, earlier than the timing of FIG. 4.

Hereupon, first, a hydraulic-pressure-rise control mode for engagement-side clutch hydraulic pressure Pon immediately after the shift-command time t1 is explained.

Immediately after the shift-command time t1 the release-side clutch is still in the release state, and thus the release-side clutch does not participate in shift shock during a loss stroke until the release-side clutch begins to engage. Also, the responsiveness of engagement of the clutch has to be enhanced. From these viewpoints, it is necessary to rise the engagement-side clutch hydraulic pressure Pon in such a manner that the loss stroke can be quickly completed.

The hydraulic-pressure-rise control for engagement-side clutch hydraulic pressure Pon immediately after the shift-command time t1 is called as "precharge control". For instance, the engagement-side hydraulic pressure Pon (the command) is set to a precharge pressure that changes in a step-up fashion and in a step-down fashion as indicated by the broken line and the one-dotted line during a time period t1-t2 of FIG. 5, such that the loss stroke of the engagement-side clutch can be quickly completed and that the engagement can be initiated without any shock.

As a matter of course for its particular purpose, the precharge control for engagement-side clutch hydraulic pressure Pon is configured to set the engagement-side hydraulic pressure Pon (the command) to the identical precharge pressure regardless of whether torque converter 3 is in a lockup state (lockup-ON state) or in a lockup-release state (lockup-OFF state), as appreciated from comparison of the broken-line characteristic (lockup-ON hydraulic pressure) and the one-dotted-line characteristic (lockup-OFF hydraulic pressure) for the engagement-side clutch hydraulic pressure Pon during the time period t1-t2 of FIG. 5.

In the case that, as shown in FIG. 5, a prediction (see step S12) of the lockup release has been made during the precharge time period t1-t2 (at the shift-command time t1 in FIG. 5), the engagement-side clutch hydraulic pressure Pon is reduced from the broken-line characteristic (lockup-ON hydraulic pressure) of FIG. 5 to the one-dotted-line characteristic (lockup-OFF hydraulic pressure) from the point of time t1 of the prediction of the lockup release (see step S15).

However, during the precharge time period t1-t2, the broken-line characteristic (lockup-ON hydraulic pressure) for the engagement-side clutch hydraulic pressure Pon and the one-dotted-line characteristic (lockup-OFF hydraulic pressure) for the engagement-side clutch hydraulic pressure Pon are identical to each other, and thus the engagement-side clutch hydraulic pressure Pon begins to practically reduce from the point of time of termination of the precharge control (corresponding to the lockup-OFF command time in FIG. 5).

Hence, after the point of time t2, the engagement-side clutch hydraulic pressure Pon is reduced from the lockup-ON hydraulic pressure indicated by the broken line to the lockup-OFF hydraulic pressure indicated by the one-dotted line (see step S15), thus providing the following effects as hereunder explained.

Assuming that the engagement-side clutch hydraulic pressure Pon is continuously determined as the high lockup-ON hydraulic pressure after the point of time t2 of termination of the precharge control, the engagement-side clutch hydraulic pressure Pon becomes excessively high as compared to the transmitted torque of the automatic transmission in the lockup-release state.

Therefore, a torque drawing-in tendency of transmission output torque, occurring at the point of time t3 of the beginning of the inertia phase during reengagement-downshifting, increases, and thus a width "A" of a subsequent change in vehicle deceleration G becomes great as indicated by the broken line.

Furthermore, the direct-coupling between engine 1, serving as a resistance to a rise in turbine speed Nt (transmission input rotational speed), and automatic transmission 2 is disengaged due to the lockup release during the inertia phase from the point of time t3 of the beginning of the inertia phase to the point of time t5 of the end of the inertia phase. Thus, as indicated by the broken line, a rapid rise in turbine speed Nt (transmission input rotational speed) occurs. Such a turbine-speed increment causes a remarkable pop-up phenomenon of transmission output torque at the point of time t5 of the end of the inertia phase (corresponding to the substantial shifting end). This results in a momentary large increase "B" in vehicle deceleration G.

The great width "A" of a change in vehicle deceleration G and the momentary large increase "B" in vehicle deceleration G become factors that increase shift shock during the coasting reengagement downshift. Anyway, these factors cause a remarkable deterioration in the shift quality of the coasting reengagement downshift.

In contrast, according to the embodiment, from the point of time t2 at which the precharge control for engagement-side clutch hydraulic pressure Pon terminates, the precharge control being initiated at the point of time t1 of the prediction (see step S12) of the lockup release occurring at the same time as the start of reengagement-downshifting in the coast lockup state, the engagement-side clutch hydraulic pressure Pon starts to reduce from the high lockup-ON hydraulic pressure indicated by the broken line to the low lockup-OFF hydraulic pressure indicated by the one-dotted line (see step S15).

Hence, the engagement-side clutch hydraulic pressure Pon does not become excessively high as compared to the transmitted torque (coast torque) of the automatic transmission when the lockup has been released, but becomes an appropriate pressure value.

Therefore, it is possible to prevent a torque drawing-in tendency of transmission output torque, which may occur at the point of time t4 of the beginning of the inertia phase during reengagement-downshifting, from increasing. Hence, it is possible to reduce a width "D" of a subsequent change in vehicle deceleration G as indicated by the solid line.

A rise in turbine speed Nt, arising from disengagement of the direct-coupling between engine 1, serving as a resistance to a rise in turbine speed Nt (transmission input rotational speed), and automatic transmission 2 due to the lockup release during the inertia phase from the point of time t4 of the beginning of the inertia phase to the point of time t6 of the end of the inertia phase, can be changed gently by virtue of a drop in engagement-side clutch hydraulic pressure Pon (see step S15) as indicated by the one-dotted line.

Such a rise in turbine speed Nt (transmission input rotational speed) tends to cause a pop-up phenomenon of transmission output torque at the point of time t6 of the end of the inertia phase (corresponding to the substantial shifting end). However, there is a less occurrence of the pop-up phenomenon of transmission output torque at the point of time t6 of the end of the inertia phase (corresponding to the substantial shifting end) because of the gentle rise in turbine speed Nt (transmission input rotational speed). Thus, vehicle deceleration G can be changed smoothly at the point of time t6 of the end of the inertia phase as indicated by the solid line, without any momentary large vehicle-deceleration increase "B".

By virtue of the small width "D" of the change in vehicle deceleration G and the smooth change in vehicle deceleration G in time series, it is possible to suppress an increase in shift shock during the coasting reengagement downshift, thus enhancing the shift quality of the coasting reengagement downshift.

By the way, the shown embodiment can provide the following effects in addition to the effects as discussed previously in reference to FIGS. 4-5.

That is, in predicting a release of the lockup through step S12, according to the previously-discussed check item (1), the lockup is predicted to be released when the vehicle speed difference between a coast lockup downshift command vehicle speed and a lockup-release vehicle speed becomes greater than or equal to a predetermined threshold value. In this case, the prediction is performed based on the preprogrammed downshift line, and therefore it is possible to perform the prediction early and surely.

Additionally, the previously-noted predetermined threshold value to be compared to the vehicle speed difference is set to a smaller value, as a degree of easier lockup-releasing increases depending on the magnitude of vehicle deceleration G and/or depending on whether a brake pedal is depressed (that is, whether the brakes are applied), and whereby it is possible to enhance the prediction accuracy of the lockup release.

Also, in predicting a release of the lockup through step S12, according to the previously-discussed check item (2), the lockup is predicted to be released when the vehicle speed difference between an actual vehicle speed during reengagement-downshifting in the coast lockup state and a lockup-release vehicle speed becomes greater than or equal to a predetermined threshold value. In this case, the prediction is performed based on the actual vehicle speed, and therefore it is possible to perform the prediction, while taking account of a disturbance, thus allowing the prediction to accord with the actual situation.

Additionally, the previously-noted predetermined threshold value to be compared to the vehicle speed difference is set to a smaller value, as a degree of easier lockup-releasing increases depending on the magnitude of vehicle deceleration G, depending on whether a brake pedal is depressed (that is, whether the brakes are applied) and/or depending on a progress of reengagement-downshifting, and whereby it is possible to enhance the prediction accuracy of the lockup release.

<Other Embodiments>

By the way, in the previously-discussed embodiment, in reducing the engagement-side clutch hydraulic pressure Pon from the lockup-ON hydraulic pressure through step S15, it is exemplified that the engagement-side clutch hydraulic pressure is reduced to the lockup-OFF hydraulic pressure. It will be appreciated that a target hydraulic pressure value used for such a pressure reduction is not limited to only the previously-discussed hydraulic pressure.

However, to ensure the previously-discussed effects, it is more preferable to reduce the engagement-side clutch hydraulic pressure Pon from the lockup-ON hydraulic pressure to the lockup-OFF hydraulic pressure.

The invention claimed is:

1. A coasting downshift control device of an automatic transmission, the automatic transmission being configured to transmit power from an engine through a torque converter and configured to shift the torque converter to a coast lockup state where an input element and an output element are directly coupled together under a predetermined condition during coast-torque transmission with the engine kept in a no-load condition, and configured to cause a reengagement downshift to a low-speed-gear shift stage by a transition of a first speed-change friction element to an engagement side and a transition of a second speed-change friction element to a release side in the coast lockup state, the coasting downshift control device comprising:

a lockup release prediction means for predicting whether a release of the coast lockup state occurs during the reengagement downshift in the coast lockup state; and an engagement-side speed-change hydraulic pressure reduction means for reducing a hydraulic pressure for engagement of the first speed-change friction element from a lockup-ON state hydraulic pressure to a lockup-OFF state hydraulic pressure suited for first speed-change friction element during the coast-torque transmission in a lockup-OFF state and less than the lockup-ON state hydraulic pressure from a point of time when the coast lockup state is predicted to be released during the reengagement downshift.

2. The coasting downshift control device for the automatic transmission as recited in claim 1, wherein:

during a loss stroke until the first speed-change friction element begins to engage from a released state, the coasting downshift control device is configured to set the hydraulic pressure of the first speed-change friction element to an identical precharge pressure regardless of whether the torque converter is in the lockup state or in the lockup-OFF state such that the loss stroke can be quickly completed, and the engagement-side speed-change hydraulic pressure reduction means is configured to start a reduction in the hydraulic pressure of the first speed-change friction element from a point of time when the loss stroke terminates, when, during the loss stroke, the lockup state is predicted to be released during the reengagement downshift.

3. The coasting downshift control device for the automatic transmission as recited in claim 2, wherein:

the engagement-side speed-change hydraulic pressure reduction means is configured to start a reduction in the hydraulic pressure of the first speed-change friction element from a point of time when the lockup state is predicted to be released, when, after the loss stroke, the lockup state is predicted to be released during the reengagement downshift.

4. The coasting downshift control device for the automatic transmission as recited in claim 1, wherein:

the lockup release prediction means predicts, based on a vehicle speed difference between a coast lockup downshift command vehicle speed when a reengagement downshift command in the coast lockup state is generated and a lockup-release vehicle speed, at which the lockup state should be released, whether the release of the lockup state occurs during the reengagement downshift in the coast lockup state.

5. The coasting downshift control device for the automatic transmission as recited in claim 4, wherein:

the lockup release prediction means predicts that the release of the lockup state occurs during the reengagement downshift in the coast lockup state, when the vehicle speed difference has reached a predetermined threshold value determined depending on at least one of a vehicle deceleration and a braking state.

6. The coasting downshift control device for the automatic transmission as recited in claim 1, wherein:

the lockup release prediction means predicts, based on a vehicle speed difference between an actual vehicle speed during the reengagement downshift in the coast lockup state and a lockup-release vehicle speed, at which the lockup state should be released, whether the release of the lockup state occurs during the reengagement downshift in the coast lockup state.

7. The coasting downshift control device for the automatic transmission as recited in claim 6, wherein:

the lockup release prediction means predicts that the release of the lockup state occurs during the reengagement downshift in the coast lockup state, when the vehicle speed difference has reached a predetermined threshold value determined depending on at least one of a vehicle deceleration, a braking state, and a progress of the reengagement downshift.

8. A coasting downshift control device of an automatic transmission, the automatic transmission being configured to transmit power from an engine through a torque converter and configured to shift the torque converter to a coast lockup state where an input element and an output element are directly coupled together under a predetermined condition during coast-torque transmission with the engine kept in a no-load condition, and configured to cause a reengagement downshift to a low-speed-gear shift stage by a transition of a first speed-change friction element to an engagement side and a transition of a second speed-change friction element to a release side in the coast lockup state, the coasting downshift control device comprising:

a lockup release prediction section configured to predict whether a release of the coast lockup state occurs during the reengagement downshift in the coast lockup state; and an engagement-side speed-change hydraulic pressure reduction means for reducing a hydraulic pressure for engagement of the first speed-change friction element from a lockup-ON state hydraulic pressure to a lockup-OFF state hydraulic pressure suited for first speed-change friction element during the coast-torque transmission in a lockup-OFF state and less than the lockup-ON state hydraulic pressure from a point of time when the coast lockup state is predicted to be released during the reengagement downshift.

9. The coasting downshift control device for the automatic transmission as recited in claim 8, wherein:

during a loss stroke until the first speed-change friction element begins to engage from a released state, the coasting downshift control device is configured to set the hydraulic pressure of the first speed-change friction element to an identical precharge pressure regardless of whether the torque converter is in the lockup state or in the lockup-OFF state such that the loss stroke can be quickly completed, and the engagement-side speed-change hydraulic pressure reduction section is configured to start a reduction in the hydraulic pressure of the first speed-change friction element from a point of time when the loss stroke terminates, when, during the loss stroke, the lockup state is predicted to be released during the reengagement downshift.

10. The coasting downshift control device for the automatic transmission as recited in claim 9, wherein:

the engagement-side speed-change hydraulic pressure reduction section is configured to start a reduction in the hydraulic pressure of the first speed-change friction element from a point of time when the lockup state is predicted to be released, when, after the loss stroke, the lockup state is predicted to be released during the reengagement downshift.

11. The coasting downshift control device for the automatic transmission as recited in claim 8, wherein:
the lockup release prediction section predicts, based on a vehicle speed difference between a coast lockup downshift command vehicle speed when a reengagement downshift command in the coast lockup state is generated and a lockup-release vehicle speed, at which the lockup state should be released, whether the release of the lockup state occurs during the reengagement downshift in the coast lockup state.

12. The coasting downshift control device for the automatic transmission as recited in claim 11, wherein:
the lockup release prediction section predicts that the release of the lockup state occurs during the reengagement downshift in the coast lockup state, when the vehicle speed difference has reached a predetermined threshold value determined depending on at least one of a vehicle deceleration and a braking state.

13. The coasting downshift control device for the automatic transmission as recited in claim 8, wherein:
the lockup release prediction section predicts, based on a vehicle speed difference between an actual vehicle speed during the reengagement downshift in the coast lockup state and a lockup-release vehicle speed, at which the lockup state should be released, whether the release of the lockup state occurs during the reengagement downshift in the coast lockup state.

14. The coasting downshift control device for the automatic transmission as recited in claim 13, wherein:
the lockup release prediction section predicts that the release of the lockup state occurs during the reengagement downshift in the coast lockup state, when the vehicle speed difference has reached a predetermined threshold value determined depending on at least one of a vehicle deceleration, a braking state, and a progress of the reengagement downshift.

* * * * *